United States Patent
Wang et al.

(10) Patent No.: US 11,970,588 B2
(45) Date of Patent: Apr. 30, 2024

(54) PRESS-SEALING METHOD OF ANIONIC POLYSACCHARIDE FILMS

(71) Applicant: Northeast Forestry University, Harbin (CN)

(72) Inventors: Lijuan Wang, Harbin (CN); Wenrui Chi, Harbin (CN)

(*) Notice: Subject to any disclaimer, the term of this patent is extended or adjusted under 35 U.S.C. 154(b) by 0 days.

(21) Appl. No.: 17/717,015

(22) PCT Filed: Nov. 12, 2021

(86) PCT No.: PCT/CN2021/130196
§ 371 (c)(1),
(2) Date: Apr. 8, 2022

(87) PCT Pub. No.: WO2022/227493
PCT Pub. Date: Nov. 3, 2022

(65) Prior Publication Data
US 2024/0084082 A1    Mar. 14, 2024

(30) Foreign Application Priority Data
Apr. 26, 2021   (CN) .......................... 202110451482.2

(51) Int. Cl.
*C08J 5/12*        (2006.01)
*B65D 65/46*     (2006.01)

(52) U.S. Cl.
CPC ............ *C08J 5/127* (2013.01); *B65D 65/466* (2013.01); *C08J 2301/28* (2013.01); *C08J 2305/04* (2013.01); *C08J 2405/08* (2013.01)

(58) Field of Classification Search
CPC .... C08J 5/127; C08J 2301/28; C08J 2305/04; C08J 2405/08; B65D 65/466
USPC .......................... 428/349, 347, 346, 343, 221
See application file for complete search history.

(56) References Cited

FOREIGN PATENT DOCUMENTS

| | | | |
|---|---|---|---|
| CN | 102120514 A | 7/2011 | |
| CN | 102580549 A | 7/2012 | |
| CN | 106046402 A | 10/2016 | |
| CN | 107840981 A | 3/2018 | |
| CN | 108192125 A | 6/2018 | |
| CN | 108314792 A | 7/2018 | |
| CN | 110341271 A | 10/2019 | |
| CN | 111621124 A | 9/2020 | |
| CN | 113174071 | * 7/2021 | |
| CN | 113174071 A | * 7/2021 | ........... B65D 65/466 |
| CN | 113174071 A | 7/2021 | |
| WO | 2017043509 A1 | 3/2017 | |

OTHER PUBLICATIONS

Wang et al, CN 113174071 Machine Translation, Jul. 27, 2021 (Year: 2021).*
Shengliang Ma, et al, Research on Edible Green Packaging Film Inquire into progress, Packaging Engineering, Dec. 31, 2020, pp. 90-97, vol. 41, No. 23, China.
Lili Zuo, et al. Effect of edible chitosan composite coating-film on shelf life of dried bean curd, Food Research and Development, Dec. 31, 2018, pp. 198-203, vol. 39, No. 21, China.

* cited by examiner

*Primary Examiner* — Jessica Whiteley

(57) ABSTRACT

A press-sealing method of anionic polysaccharide films is disclosed, aiming to solve the technical problem that the existing polysaccharide films are difficult to be press-sealed into a bag. The press-sealing method includes following steps. (1) A chitosan quaternary ammonium salt solution is prepared. (2) An anionic polysaccharide film is pretreated. (3) The chitosan quaternary ammonium salt solution is applied to a part to be sealed between two anionic polysaccharide films, and the part be sealed is pressed for 1~2 s under conditions of a pressure of 0.3~0.5 MPa and a temperature of 20~30° C. to complete the press-sealing. The press-sealing strength of the anionic polysaccharide films after press-sealing is 1.38±0.26~6.95±0.95 N/15 mm. It is used for packaging beef tallow and other foods, can effectively prolong the shelf life of foods, and can be used in the field of food packaging.

5 Claims, 16 Drawing Sheets

PRESS-SEALING METHOD OF ANIONIC POLYSACCHARIDE FILMS

TECHNICAL FIELD

The present disclosure relates to the technical field of food packaging materials, and more specifically, to a press-sealing method of anionic polysaccharide films.

BACKGROUND ART

As is known to all, the non-degradability of plastic packaging film has caused a lot of white pollution and great harm to the environment. In 2020, China banned or restricted the use of some plastic preparation in some regions and fields. At present, about 500 billion plastic bags are used every day in China, but only 3% are recycled, which means that using degradable biomass packaging film instead of plastic will help reduce pollution. Polysaccharides exist widely in nature, and have attracted more and more researchers' attention because of their renewability and biodegradability. Carrageenan is a negatively charged linear polysaccharide extracted from red algae. It is widely used in food and pharmaceutical industries. As the main material of film formation, it has good oxygen resistance and has been used to make antibacterial film and food freshness monitoring label. However, similar to other polysaccharide films, κ-carrageenan film does not have a molten state in the hot state, so it is difficult to heat seal into a bag, which is the main reason why it is difficult to be popularized as an edible packaging film.

SUMMARY

The disclosure aims to solve the technical problem that the existing polysaccharide film is difficult to be press-sealed into a bag, and provides a press-sealing method of anionic polysaccharide films.

The press-sealing method of anionic polysaccharide films is carried out according to following steps.
(1) Preparation of chitosan quaternary ammonium salt solution. 0.5~1.5 g of chitosan quaternary ammonium salt is added into 100 ml distilled water and stirred at a room temperature until the chitosan quaternary ammonium salt is completely dissolved to obtain a chitosan quaternary ammonium salt solution.
(2) An anionic polysaccharide film is pretreated in an environment with a temperature of 20~30° C. and a humidity of 43%~75% RH for 6~12 h.
(3) The chitosan quaternary ammonium salt solution is applied to a part to be sealed between two anionic polysaccharide films, and the part be sealed is pressed for 1~2 s under conditions of a pressure of 0.3~0.5 MPa and a temperature of 20~30° C., so as to complete the press-sealing of the anionic polysaccharide films.

Further, the anionic polysaccharide film in step (2) is κ-carrageenan film, sodium carboxymethylcellulose film or sodium alginate film.

Further, a preparation method of the κ-carrageenan film described in step (2) is as follows. κ-carrageenan is added into distilled water at 60~80° C. and stirred for 30~45 min, then sorbitol is added and stirred for 30~45 min to obtain a film-forming solution. The film-forming solution is poured into a plastic tank while being hot to cast a film, and the film is dried at a temperature of 50~60° C. to obtain the κ-carrageenan film. And a mass ratio of the κ-carrageenan, the distilled water and the sorbitol is (1.5~2.5):(200~400): 1.

Further, an overlap of the part to be sealed between the two anionic polysaccharide films in step (3) is 5~10 mm.

The disclosure adopts chitosan quaternary ammonium salt as the adhesive. Chitosan quaternary ammonium salt is a positively charged polysaccharide, which can be used as a bridge to connect two κ-carrageenan films through the action of electrostatic force, and the two κ-carrageenan films can be bonded together by normal temperature press-sealing. The press-sealing method has the following advantages.
(1) The raw materials used are renewable and degradable substances, which have no negative impact on the environment.
(2) The problem that anionic polysaccharide film can not become an effective packaging material in practical application is solved.
(3) There is no need to heat during the press-sealing, which is more energy-saving than traditional heat-sealing materials.

The press-sealing strength of the anionic polysaccharide films after the press-sealing is 1.38±0.26~6.95±0.95 N/15 mm. The carrageenan packaging bag sealed by this method is used to package beef tallow, which can effectively prolong the shelf life of food. The method of the disclosure can not only promote the application of other polysaccharides with anions, but also effectively reduce the use of plastics, so as to effectively protect the environment and can be used in the field of food packaging.

DETAILED DESCRIPTION OF THE EMBODIMENTS

The following embodiments are used to verify the beneficial effects of the disclosure.

Embodiment 1: the press-sealing method of anionic polysaccharide films was carried out according to following steps.

(1) Preparation of chitosan quaternary ammonium salt solution. 0.5 g of chitosan quaternary ammonium salt was added into 100 ml distilled water and stirred at a room temperature until the chitosan quaternary ammonium salt was completely dissolved to obtain a chitosan quaternary ammonium salt solution.

(2) 6 g κ-carrageenan was added into 400 mL distilled water at 65° C. and stirred for 45 min, then 3 g sorbitol was added and stirred for 45 min to obtain a film-forming solution. The film-forming solution was poured into a plastic tank while being hot to cast a film, and the film was dried at a temperature of 50° C. for 24 h to obtain the κ-carrageenan film. And the κ-carrageenan film was pretreated in an environment with a temperature of 25° C. and a humidity of 53% RH for 6 h.

(3) The chitosan quaternary ammonium salt solution was applied to a part to be sealed between two κ-carrageenan films. The part to be sealed was overlapped by 10 mm, and the part was pressed for is under the conditions of pressure of 0.45 MPa and temperature of 25° C., so as to complete the press-sealing of the κ-carrageenan films. The press-sealing sample was marked as κC-5CQAS.

Figure 1:
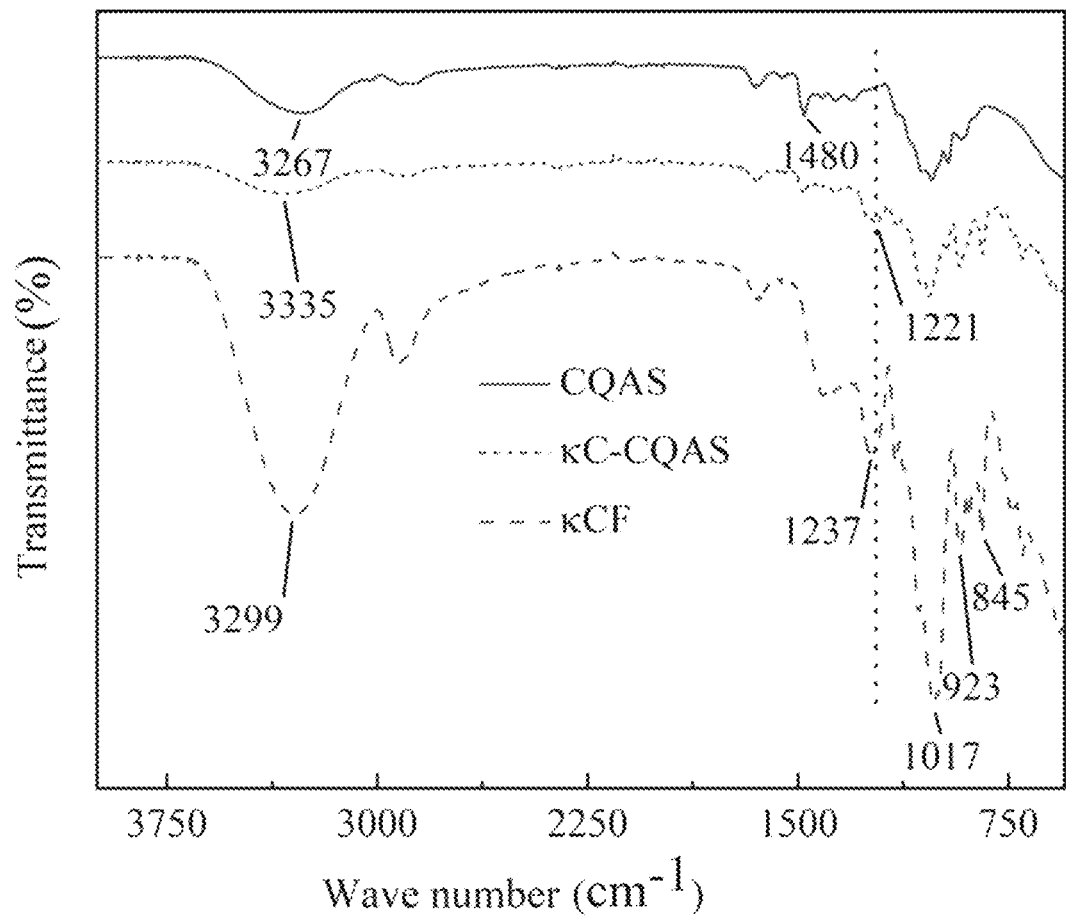
FIG. 1 is an infrared spectrum of κCF, CQAS and κCF-CQAS in embodiment 1.
Figure 2:
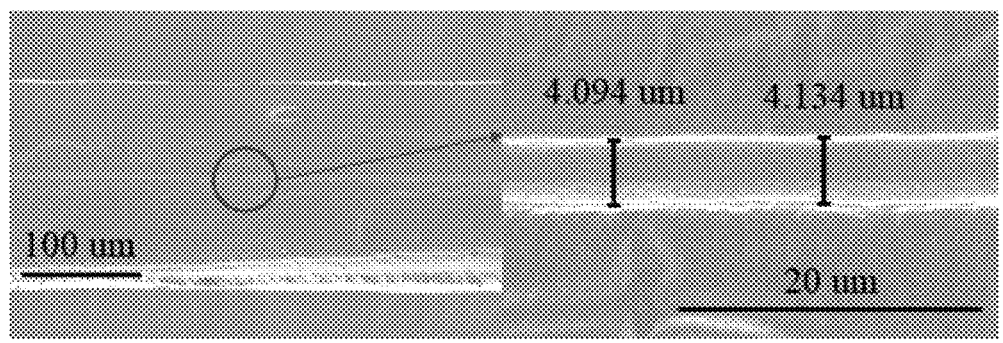
FIG. 2 is a SEM picture of the cross section of κC-5CQAS in embodiment 1.
Figure 3:
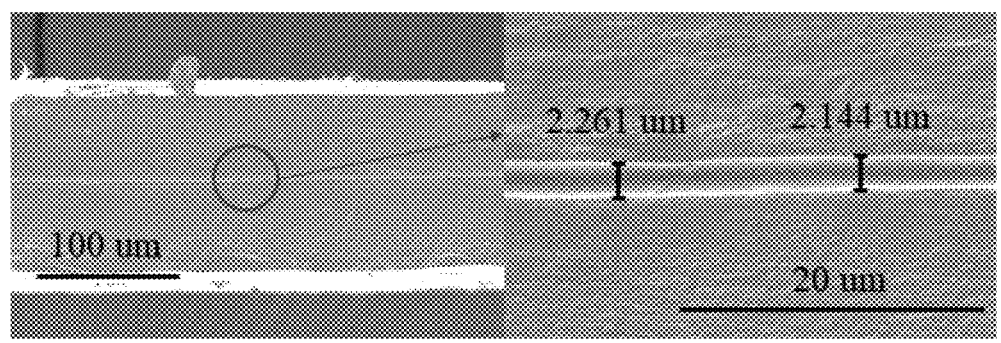
FIG. 3 is a SEM picture of the cross section of κC-10CQAS in embodiment 2.
Figure 4:
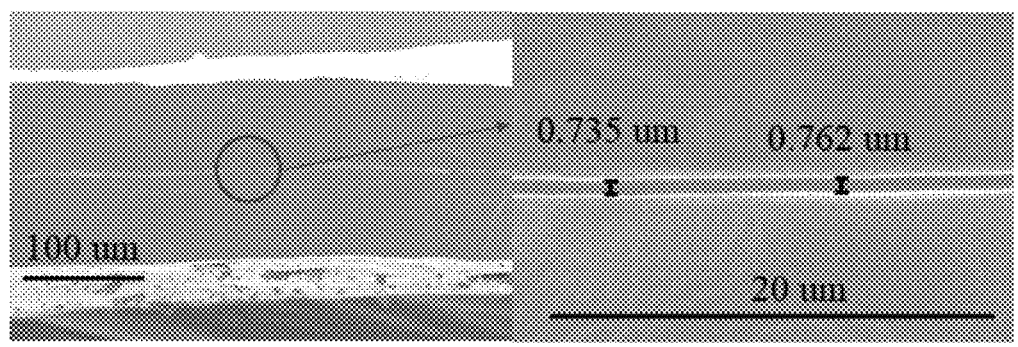
FIG. 4 is a SEM picture of the cross section of κC-15CQAS in embodiment 3.
Figure 5:
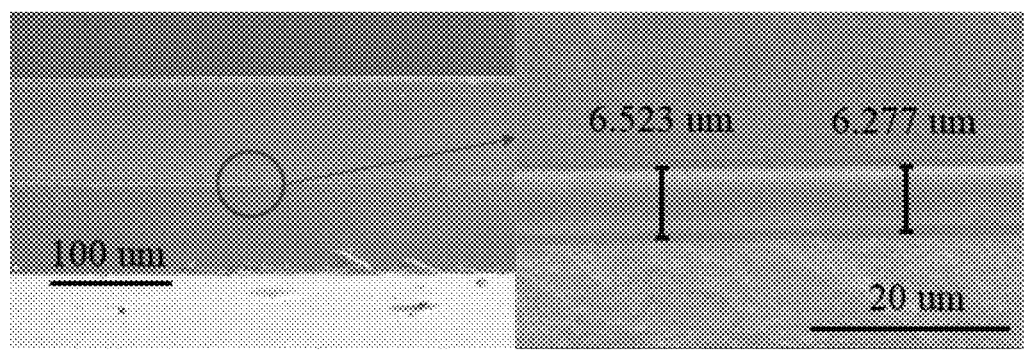
FIG. 5 is a SEM picture of the cross section of κC-15CQAS (pressureless) in embodiment 4.

The infrared spectra of chitosan quaternary ammonium salt (CQAS), κ-carrageenan (κCF) and the mixed precipitate of 100 ml of 15 g/L chitosan quaternary ammonium salt and 400 ml of 15 g/L κ-carrageenan were tested. The infrared spectra were shown in FIG. 1. 3267-3335 $cm^{-1}$ is the characteristic absorption peak of N—H or O—H, and 2925 $cm^{-1}$ and 2884 $cm^{-1}$ are the stretching vibration and bending vibration of C—H. It can be seen from FIG. 1 that the characteristic peaks of κCF are 1237 $cm^{-1}$ (sulfate), 923 $cm^{-1}$ (3,6-dehydrated galactose) and 845 $cm^{-1}$ (galactose-4-sulfate). 1480 $cm^{-1}$ is the quaternary ammonium salt side chain of CQAS. When the two are combined, the characteristic peak of κCF at 1237 $cm^{-1}$ shifts to 1221 $cm^{-1}$, which is due to the combination of carrageenan and CQAS through electrostatic force.

Embodiment 2: the difference between this embodiment and embodiment 1 is that the addition amount of chitosan quaternary ammonium salt in step (1) was 1.0 g, and others were the same as embodiment 1. The obtained press-sealing sample was recorded as κC-10CQAS.

Embodiment 3: the difference between this embodiment and embodiment 1 is that the addition amount of chitosan quaternary ammonium salt in step (1) was 1.5 g, and others were the same as embodiment 1. The obtained press-sealing sample was recorded as κC-15CQAS.

Embodiment 4: the difference between this embodiment and embodiment 1 is that the addition amount of chitosan quaternary ammonium salt in step 1 was 1.5 g, and the pressure in step (3) was 0 MPa. Others were the same as embodiment 1. The sample obtained was recorded as κC-15CQAS (pressureless).

The samples of the κ-carrageenan films press-sealed in embodiments 1, 2, 3 and 4 were cut to 15 mm×65 mm strips, dried at 70° C. for 1 h, then placed in the environment of constant humidity at 53% RH for 1, 2, 4, 6 and 12 hours. The samples after 12 hours of constant humidity were taken for scanning electron microscope (SEM) observation. The SEM photos obtained are shown in FIGS. 2, 3, 4 and 5 in turn. The data of the gap between the two κ-carrageenan films are shown in Table 1.

TABLE 1

| Gap width of samples prepared in embodiments 1, 2, 3 and 4 | | | | |
|---|---|---|---|---|
| Sample | Embodiment 1 | Embodiment 2 | Embodiment3 | Embodiment4 |
| Gap width (μm) | 4.114 ± 0.020 | 2.203 ± 0.059 | 0.749 ± 0.014 | 6.400 ± 0.123 |

Comparing FIGS. 2, 3, 4 and 5, it can be seen that the gap widths between the two κ-carrageenan films gradually decreased with the increase of the concentration of chitosan quaternary ammonium salt, which may be due to the increase of bonding sites between chitosan quaternary ammonium salt and κ-carrageenan. However, when there was pressureless adhesion (chitosan quaternary ammonium salt 15 g/L), the gap widths between carrageenan films increased again, indicating that the pressure was conducive to the combination of chitosan quaternary ammonium salt and κ-carrageenan.

Figure 6:
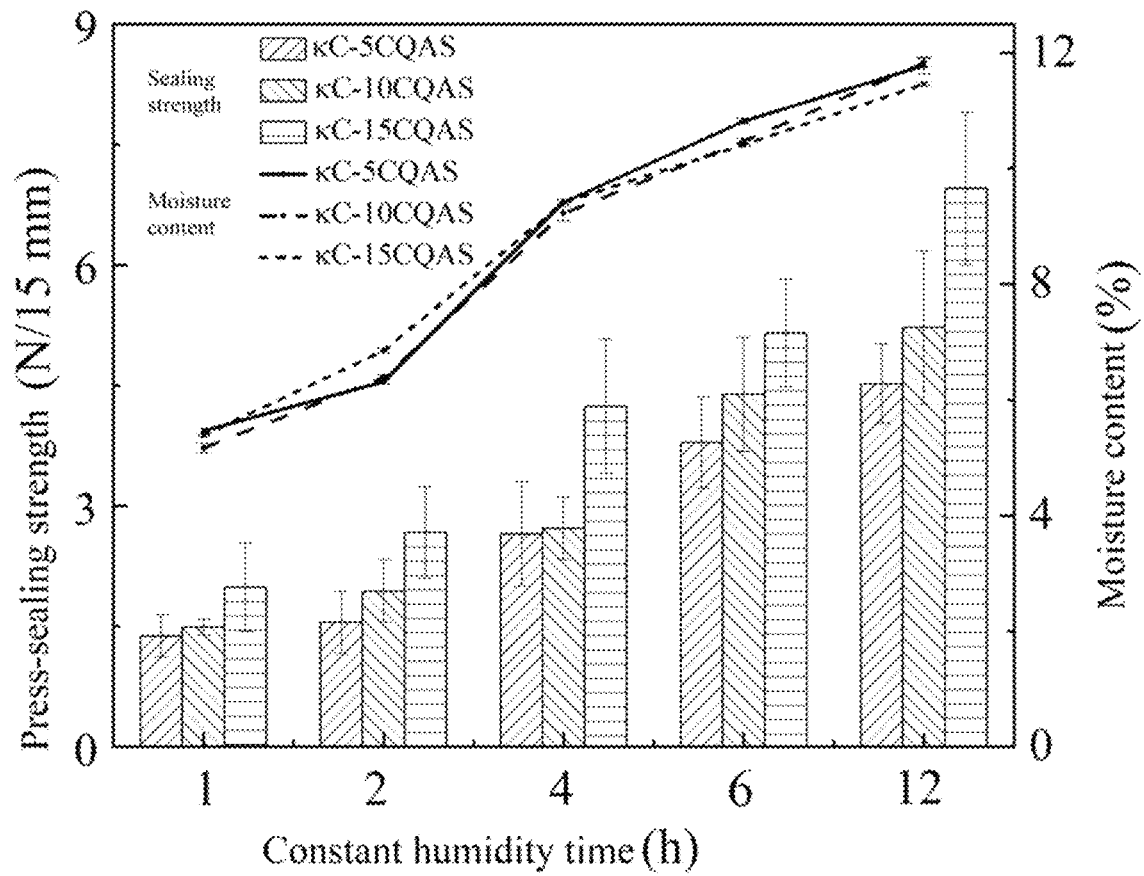
FIG. 6 is a diagram of the test results of the press-sealing strength and moisture content of the samples prepared in embodiments 1, 2 and 3 under different constant humidity times.

The samples prepared in embodiments 1, 2 and 3 were tested for press-sealing strength and moisture content. The obtained press-sealing strength and moisture content are shown in FIG. 6. It can be seen from FIG. 6 that the press-sealing strength of κC-CQAS increased with the increase of CQAS content from 5 g/L to 15 g/L, which may be caused by the increase of CQAS and κC link sites. At the same time, with the increase of constant humidity time, the press-sealing strength increased. The specific press-sealing strength data of the samples of embodiments 1, 2 and 3 are shown in Table 2.

TABLE 2

Press-sealing strength of samples prepared in embodiments 1, 2 and 3

| | Press-sealing strength (N/15 mm) | | | | |
|---|---|---|---|---|---|
| Sample | Constant humidity 1 h | Constant humidity 2 h | Constant humidity 4 h | Constant humidity 6 h | Constant humidity 12 h |
| Embodiment 1 | 1.38 ± 0.26 | 1.55 ± 0.39 | 2.65 ± 0.65 | 3.79 ± 0.57 | 4.52 ± 0.49 |
| Embodiment 2 | 1.49 ± 0.10 | 1.94 ± 0.39 | 2.72 ± 0.39 | 4.39 ± 0.71 | 5.22 ± 0.95 |
| Embodiment 3 | 1.99 ± 0.55 | 2.67 ± 0.57 | 4.24 ± 0.83 | 5.15 ± 0.67 | 6.95 ± 0.95 |

Figure 7:
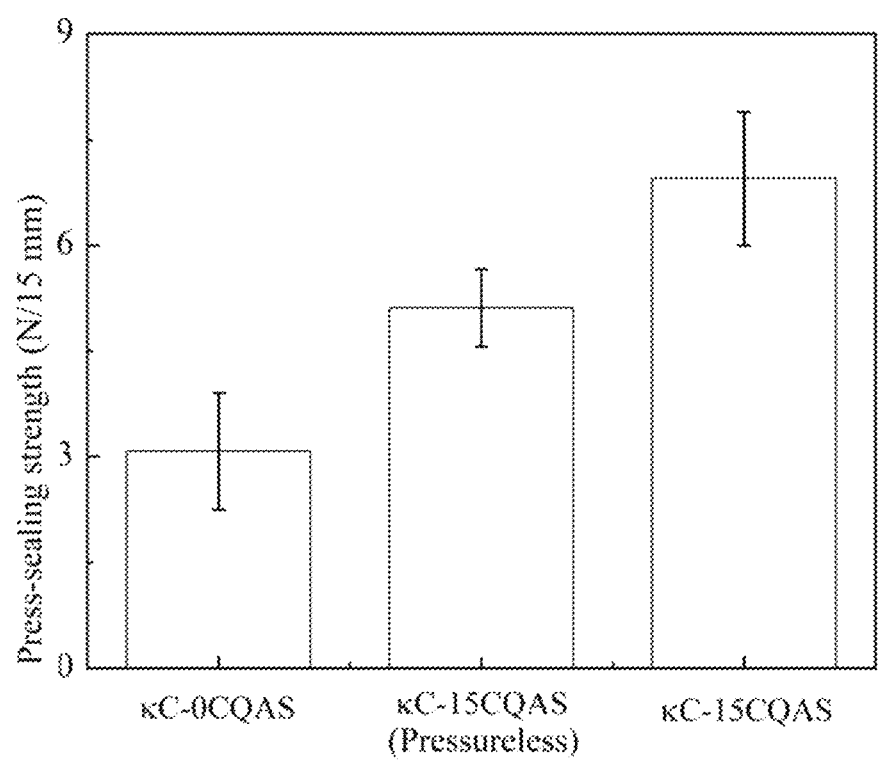
FIG. 7 is a comparative diagram of the press-sealing strength of κC-0CQAS (water as adhesive), κC-15CQAS and κC-15CQAS (pressureless) after 12 hours of constant humidity at 53% RH.

Generally, the heating-sealing strength of polyethylene film is about 8 N/15 mm. Although the press-sealing strength of the samples prepared by this method was lower than the heating-sealing strength of polyethylene film, it can also meet the normal use. After the two κ-carrageenan films were sealed with water as the adhesive, the press-sealing strength was compared with that of the pressureless κC-15CQAS film prepared in the embodiment 4 and the κC-15CQAS prepared in embodiment 3. As shown in FIG. 7, it can be seen that when only water is used as the adhesive, the space between the two films was occupied by water and still had a certain sealing strength (3.08±0.83 N/15 mm) under the action of atmospheric pressure. The press-sealing strength of the pressureless sample was low, because the pressure can remove the air between the two films and increase the bonding area between CQAS and KC.

Figure 8:
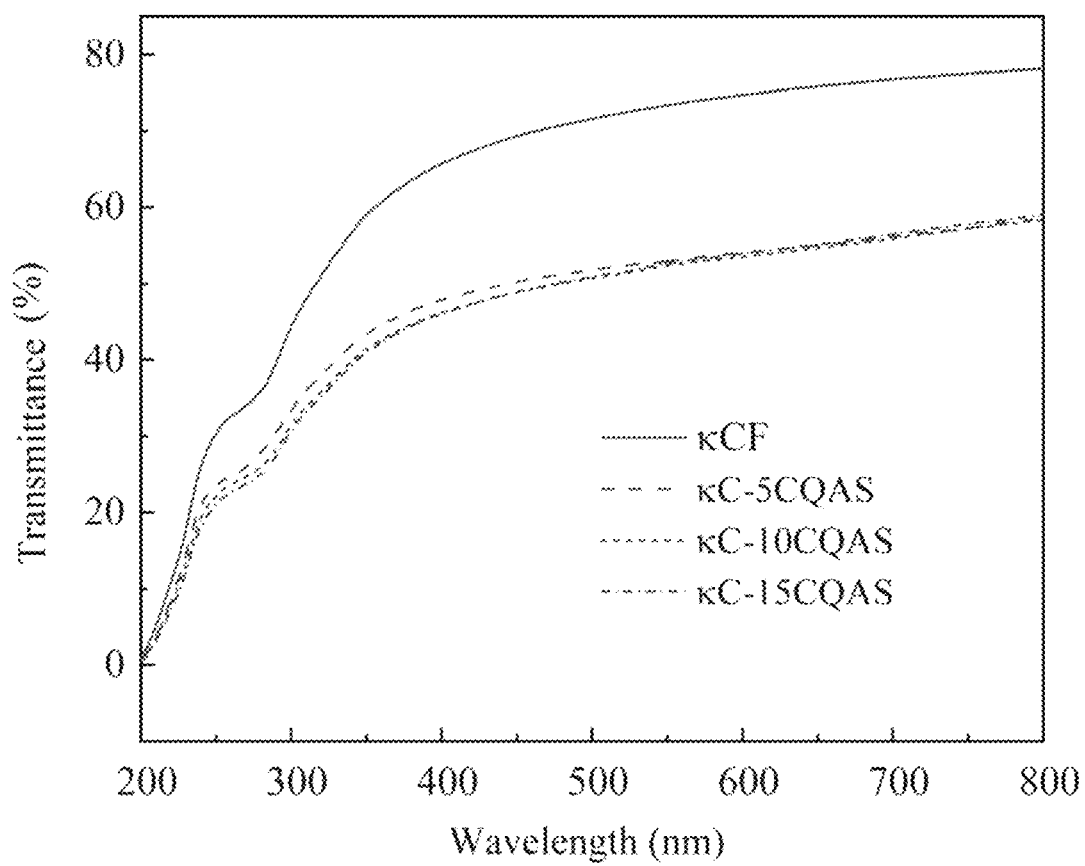
FIG. 8 shows the optical properties of κCF and samples κC-5CQAS, κC-10CQAS and κC-15CQAS prepared in embodiments 1, 2 and 3 just after press-sealing.
Figure 9:
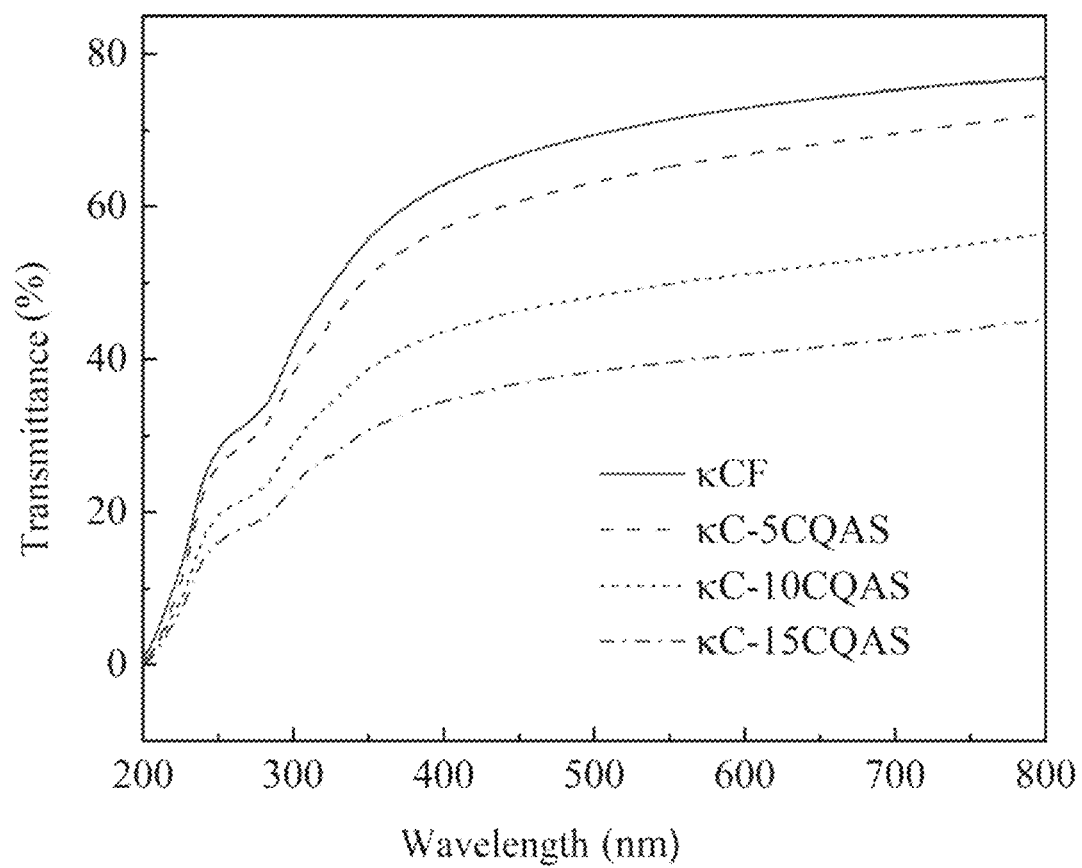
FIG. 9 shows the optical properties of κCF and samples κC-5CQAS, κC-10CQAS and κC-15CQAS prepared in embodiments 1, 2 and 3 after drying at 70° C. for 1 h.
Figure 10:
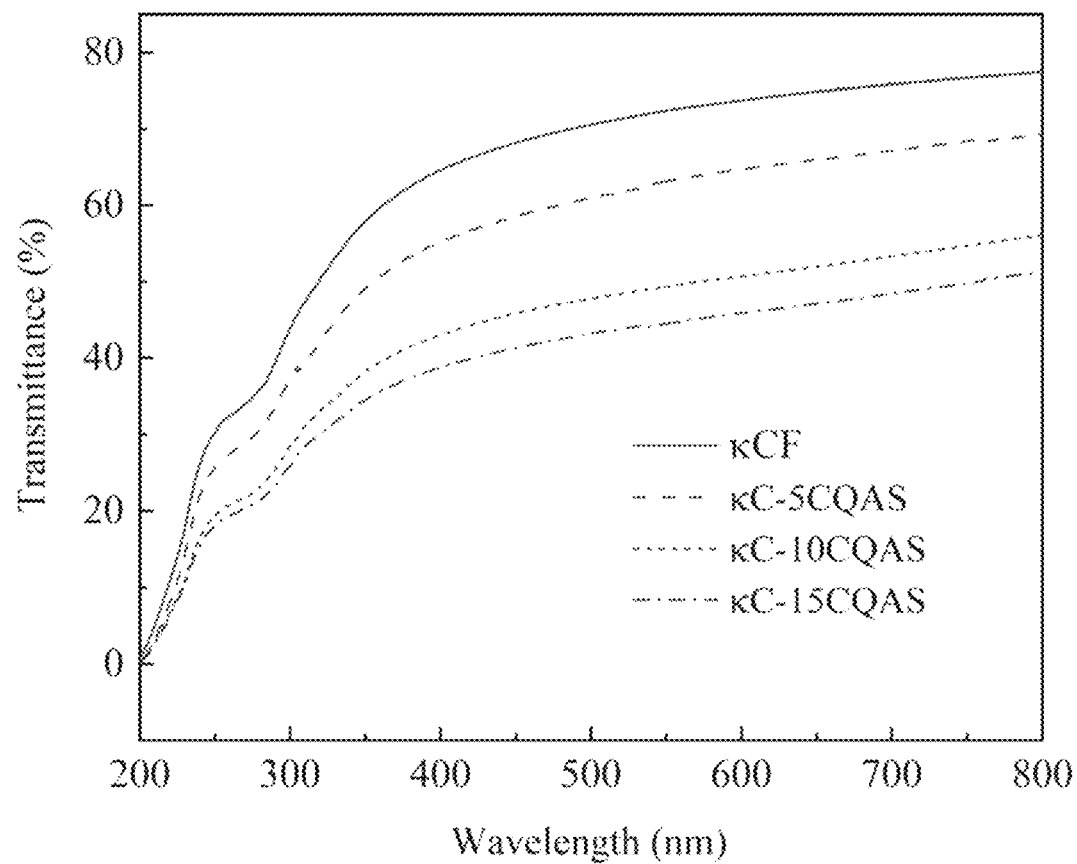
FIG. 10 shows the optical properties of κCF and samples κC-5CQAS, κC-10CQAS and κC-15CQAS prepared in embodiments 1, 2 and 3 after drying at 70° C. for 1 h and then continuing 12 hours of constant humidity at 53% RH.

The optical properties of κCF and samples κC-5CQAS, κC-10CQAS and κC-15CQAS prepared in embodiments 1, 2 and 3 were tested at three time points just after sealing, after drying at 70° C. for 1 h and after constant humidity at 53% RH for 12 h, as shown in FIGS. 8, 9, 10 and Table 3. It can be seen from FIGS. 8, 9 and 10 that the light transmittance of the samples after press-sealing was less than that of κCF. When the press-sealing was just completed, the light transmittances of κC-5CQAS, κC-10CQAS and κC-15CQAS were close (53.565~54.091%) because the sealing strips contained a large amount of water and had strong reflection and refraction to light. After drying the samples at 70° C. for 1 h, the light transmittance of the samples after water loss decreased from 63.891% to 40.612% with the increase of the amount of CQAS, which is due to the formation of new substances between CQAS and KC increased the reflection and scattering of light. After drying at 70° C. for 1 h and then continuing constant humidity at 53% RH for 12 h, the light transmittance of κC-5CQAS, κC-10CQAS decreased slightly due to the increase of water content. The light transmittance of κC-15CQAS increased, which is mainly due to the increase of water, which prevented the electrostatic interaction between CQAS and KC, and reduced the scattering and refraction of light. Detailed data are listed in Table 3.

TABLE 3

Transmittance at 600 nm of embodiments 1, 2, 3 and κCF

| | Transmittance (%) (600 nm) | | |
|---|---|---|---|
| Sample | just after press-sealing | drying at 70° C. for 1 h | constant humidity at 53% RH for 12 h |
| κCF | 74.733 | 73.024 | 73.700 |
| Embodiment 1 | 54.091 | 66.891 | 64.740 |
| Embodiment 2 | 53.565 | 51.201 | 50.730 |
| Embodiment 3 | 53.962 | 40.612 | 45.916 |

The optical property test of the films of samples κC-5CQAS, κC-10CQAS and κC-15CQAS prepared in embodiments 1, 2 and 3 also shows that the light transmittance was reduced due to the combination of CQAS and carrageenan through electrostatic action. However, since only the edge of the packaging bag is press-sealed when packaging food, it does not affect the visual sense of the food in the bag after packaging.

Figure 11:
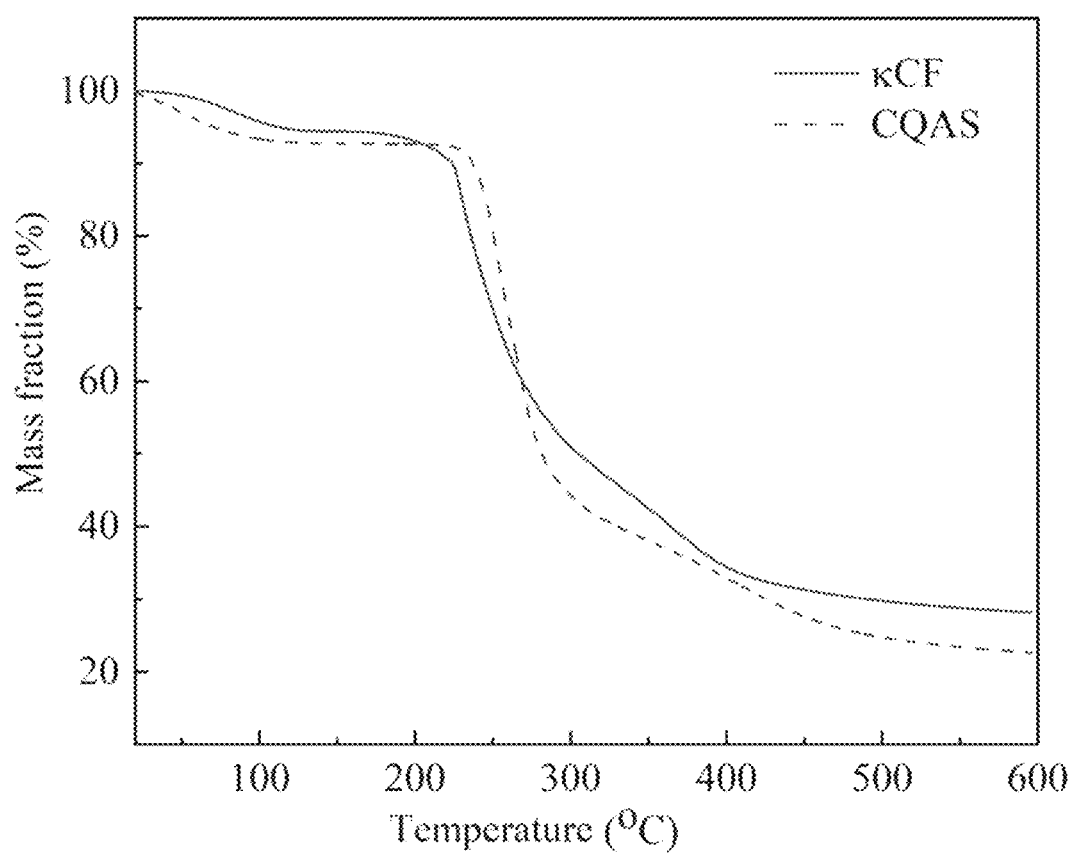
FIG. 11 shows TG spectra of κCF and CQAS in embodiment 1.
Figure 12:
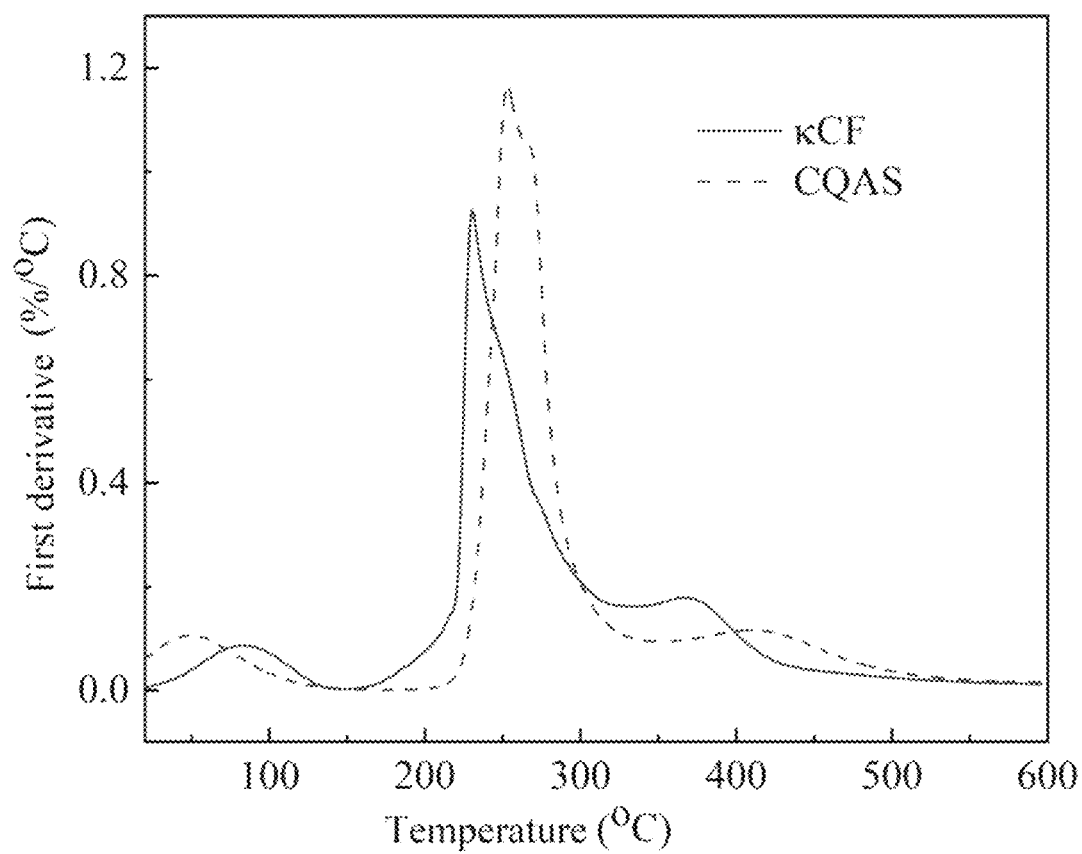
FIG. 12 shows DTG spectra of κCF and CQAS in embodiment 1.
Figure 13:
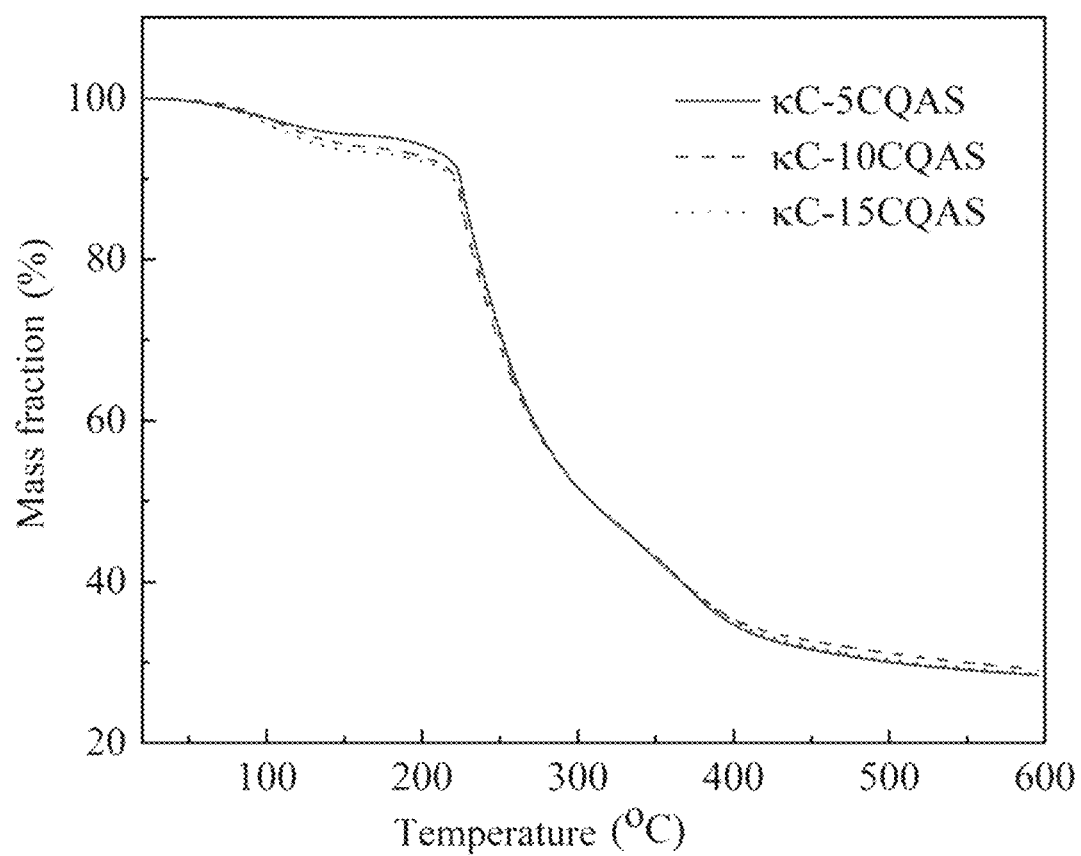
FIG. 13 shows TG spectra of samples κC-5CQAS, κC-10CQAS and κC-15CQAS prepared in embodiments 1, 2 and 3.
Figure 14:
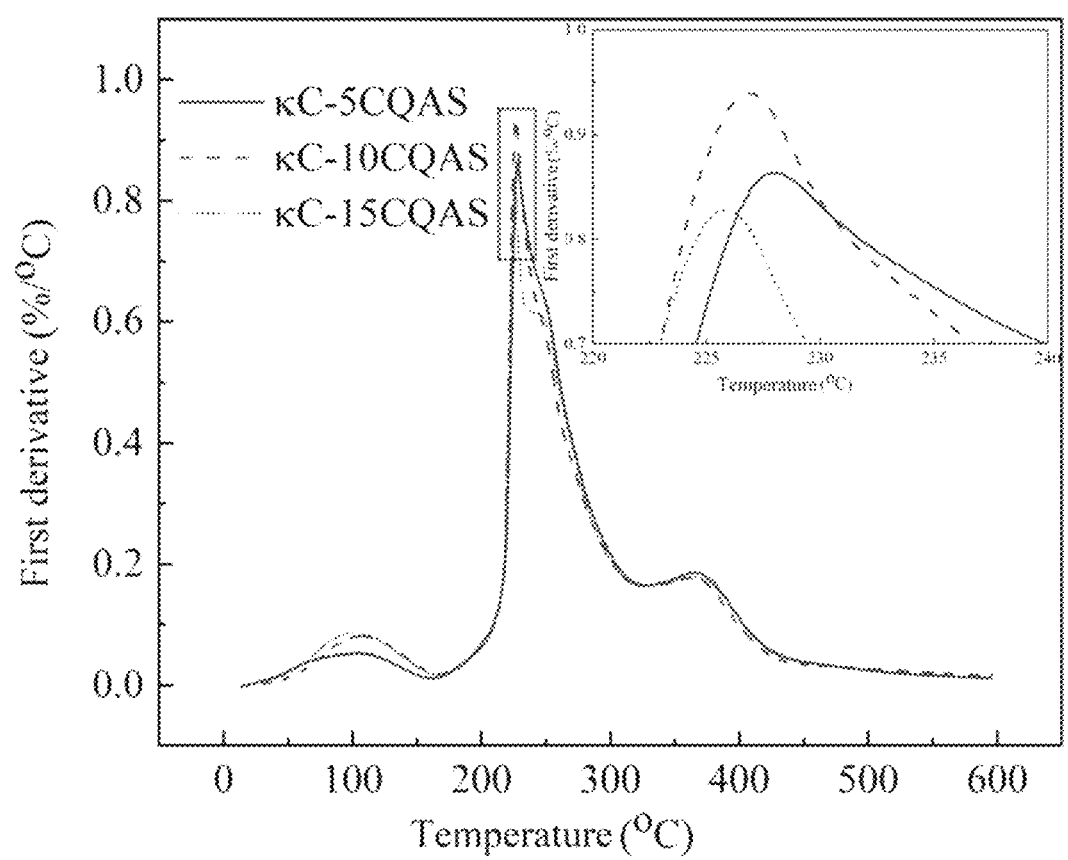
FIG. 14 shows DTG spectra of samples κC-5CQAS, κC-10CQAS and κC-15CQAS prepared in embodiments 1, 2 and 3.

The TG spectra of κCF and CQAS in embodiment 1 are shown in FIG. 11, the DTG spectra are shown in FIG. 12, the TG spectra of samples κC-5CQAS, κC-10CQAS and κC-15CQAS prepared in embodiments 1, 2 and 3 are shown in FIG. 13, the DTG spectra are shown in FIG. 14. As shown in FIG. 11 and FIG. 12, the spectra of κCF and CQAS are mainly divided into two stages. The first stage is mainly the evaporation of water, and the temperatures are 22.86~122.20° C. and 17.3~120.36° C. respectively. It may be that the water retention of κCF is better than CQAS, which makes its water loss temperature slightly higher. The second weight loss stage is 215.60~415.53° C. and 232.34~281.23° C. respectively. This stage is mainly the decomposition of polysaccharides, and the thermal decomposition temperature of CQAS is slightly higher than that of κCF. Therefore, the thermal stability of KC-CQAS is slightly higher than that of κCF, indicating that the thermal stability of the press-sealing part of carrageenan film is slightly improved, and the press-sealing has no effect on the packaging. It can be seen from FIG. 13 and FIG. 14 that the thermal stability of KC-CQAS does not change with the increase of the amount of CQAS, which may be due to the small amount of CQAS added. The thermal decomposition data of the samples of embodiments 1, 2 and 3 and κCF and CQAS are listed in Table 4.

TABLE 4

Thermal decomposition performance data of samples in embodiments 1, 2 and 3, κCF and CQAS

| Sample | $T_o$ (° C.) | $T_E$ (° C.) | $T_{DTG\ max}$ (° C.) |
|---|---|---|---|
| κCF | 215.60 | 415.33 | 230.34 |
| CQAS | 232.34 | 468.35 | 252.9 |
| Embodiment 1 | 217.24 | 408.72 | 227.99 |
| Embodiment 2 | 217.69 | 408.66 | 226.85 |
| Embodiment 3 | 217.52 | 408.34 | 225.76 |

The barrier properties of PE and κCF are shown in Table 5. It can be seen from table 5 that the water vapor transmittance of PE is lower than that of κCF, but the oxygen permeability is higher than that of κCF.

TABLE 5

Barrier performance of PE and κCF

| Sample | Thickness (um) | Water vapor transmittance (g m$^{-1}$ s$^{-1}$ Pa$^{-1}$ × 10$^{-12}$) | Oxygen permeability (cm$^3$ mm m$^{-2}$ dat$^{-1}$ atm$^{-1}$) |
|---|---|---|---|
| PE | 77.400 ± 0.490 | 1.001 ± 0.084 | 7376.256 ± 18.829 |
| κCF | 69.3 ± 2.65 | 137.760 ± 3.001 | 1.479 ± 0.213 |

Figure 15:
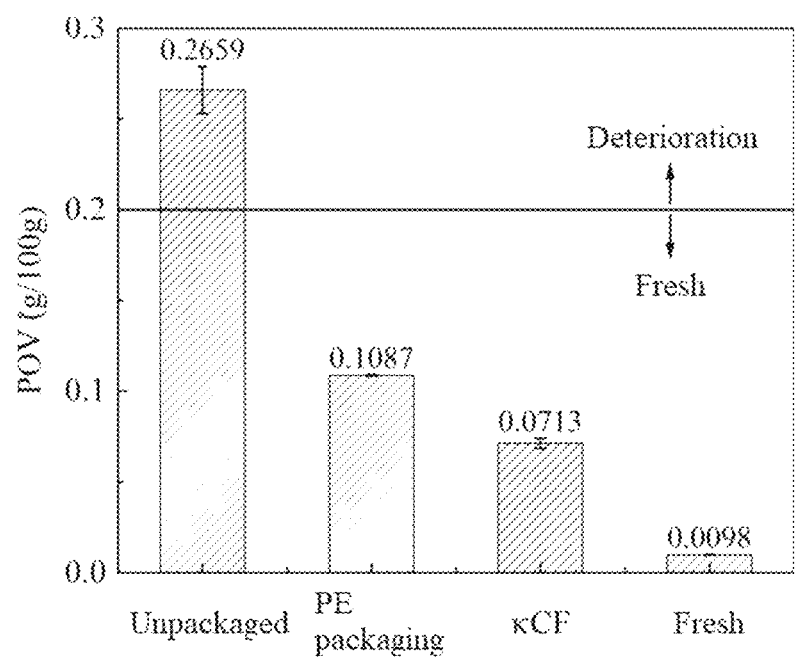
FIG. 15 is a diagram showing the change of peroxide value of beef tallow press-sealed in the packaging film.

In order to investigate the sealing performance of the method of the disclosure, the beef tallow was packaged with PE film and κCF respectively, and the κCF packaged beef tallow was press-sealed with the method of embodiment 3, i.e., κC-15CQAS. The peroxide value (POV) of unpackaged beef tallow was measured 75 days after packaging to explore the application of press-sealing film in food packaging. The peroxide value obtained was shown in FIG. 15. It can be seen from FIG. 15 that the POV of fresh beef tallow is 0.0098 g/100 g, which increases to 0.2659 g/100 g after 75 days and has deteriorated. The POV of beef tallow packed with PE is 0.1087 g/100 g, which is lower than that of the sample in air, and it does not deteriorate after 75 days because PE has certain oxygen barrier. The κCF bags press-sealed with in the method of embodiment 3 has a better oxygen barrier and can better limit the penetration of oxygen into the package. Therefore, the POV of the beef tallow packed with κCF is only 0.0713 g/100 g. When used in the packaging of oil food, it can effectively prolong the shelf life of food. At the same time, the results can also prove that the method of embodiment 3 has good sealing performance of the press-sealing.

Figure 16:
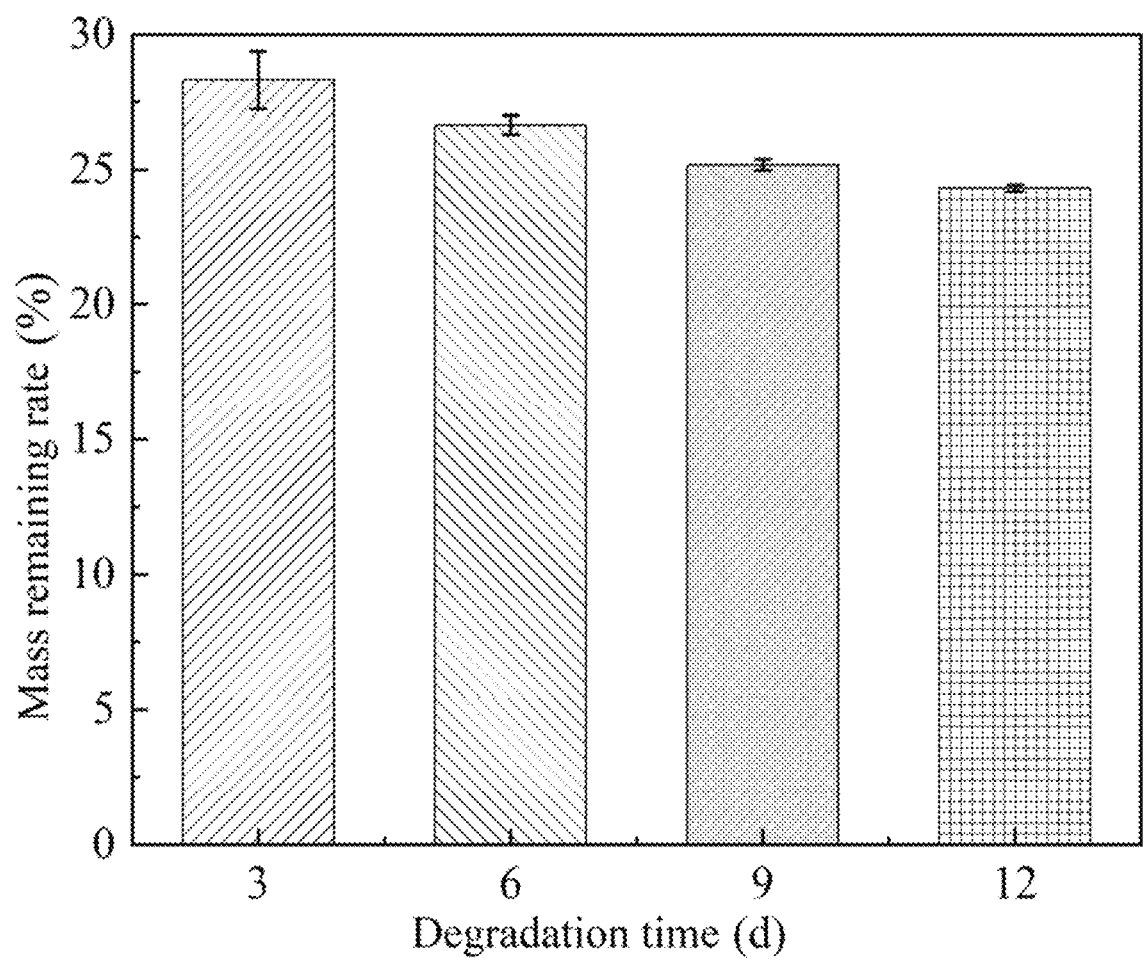
FIG. 16 is a result diagram of the mass remaining rate of κC-15CQAS degradation in soil.

Degradability is also an important index to investigate food packaging. Generally, plastics take hundreds of years to degrade, and even degradable plastics take months to years. κC-15CQAS, the press-sealed sample of embodiment 3, was placed in the soil for natural degradation, and the residual rate in the soil at different days was shown in FIG. 16. It can be seen from FIG. 16 that 71.69% was degraded in 3 days, but only 3.99% was degraded in the next 9 days because the CQAS used had certain antibacterial properties. However, compared with plastic products, it has good biodegradability as a packaging film material.

What is claimed is:

1. A press-sealing method of anionic polysaccharide films, comprising:

(1) preparation of chitosan quaternary ammonium salt solution: adding 0.5-1.5 g of chitosan quaternary ammonium salt into 100 ml distilled water and stirring at a room temperature until the chitosan quaternary ammonium salt is completely dissolved to obtain a chitosan quaternary ammonium salt solution;
   (2) pretreating an anionic polysaccharide film in an environment under a temperature of 20-30° C. and a humidity of 43%-75% RH for 6-12 h;
   (3) applying the chitosan quaternary ammonium salt solution to a part to be sealed between two anionic polysaccharide films, and pressing the part be sealed for 1-2 s under conditions of a pressure of 0.3-0.5 MPa and a temperature of 20-30° C., so as to complete the press-sealing of the anionic polysaccharide films.

2. The press-sealing method of anionic polysaccharide films of claim 1, wherein the anionic polysaccharide film in step (2) is κ-carrageenan film, sodium carboxymethylcellulose film or sodium alginate film.

3. The press-sealing method of anionic polysaccharide films of claim 2, wherein a preparation method of the κ-carrageenan film described in step (2) comprising: adding κ-carrageenan into distilled water at 60-80° C. and stirring for 30-45 min, then adding sorbitol and stirring for 30-45 min to obtain a film-forming solution; pouring the film-forming solution into a plastic tank while being hot to cast a film, and drying the film at a temperature of 50-60° C. to obtain the κ-carrageenan film.

4. The press-sealing method of anionic polysaccharide films of claim 3, wherein a mass ratio of the κ-carrageenan, the distilled water and the sorbitol is (1.5~2.5):(200~400):1.

5. The press-sealing method of anionic polysaccharide films of claim 1, wherein an overlap of the part to be sealed between the two anionic polysaccharide films in step (3) is 5-10 mm.

* * * * *